United States Patent [19]

Valdes

[11] 4,369,515
[45] Jan. 18, 1983

[54] CLOCK SYNCHRONIZATION CIRCUIT
[75] Inventor: Jose L. Valdes, Chicago, Ill.
[73] Assignee: GTE Automatic Electric Labs Inc., Northlake, Ill.
[21] Appl. No.: 194,652
[22] Filed: Oct. 6, 1980
[51] Int. Cl.³ .............................................. H04L 7/00
[52] U.S. Cl. ............................. 375/108; 307/200 A; 328/72; 375/20; 375/120
[58] Field of Search ................ 340/507, 508; 368/119; 307/200 A, 219; 328/72–74; 331/49; 371/47; 375/4, 20, 108, 120; 370/100

[56] References Cited
U.S. PATENT DOCUMENTS 3,795,872  3/1974  Napolitano et al. .................. 331/49
4,271,526  6/1981  Flora .................................. 375/20
4,277,693  7/1981  Hoekman ........................... 307/219
4,282,493  8/1981  Moreau ............................. 307/219

Primary Examiner—Benedict V. Safourek
Attorney, Agent, or Firm—Robert J. Black; Gregory G. Hendricks

[57] ABSTRACT

A circuit which monitors the frequency of an incoming signal and synchronizes an internally generated clock signal to the incoming signal. A retriggerable monostable multivibrator monitors the incoming signal which is synchronized by means of a phase lock loop circuit to a signal generated by a voltage controlled multivibrator. A crystal oscillator provides clock signals upon detection of failure of the incoming clock signal.

9 Claims, 1 Drawing Figure

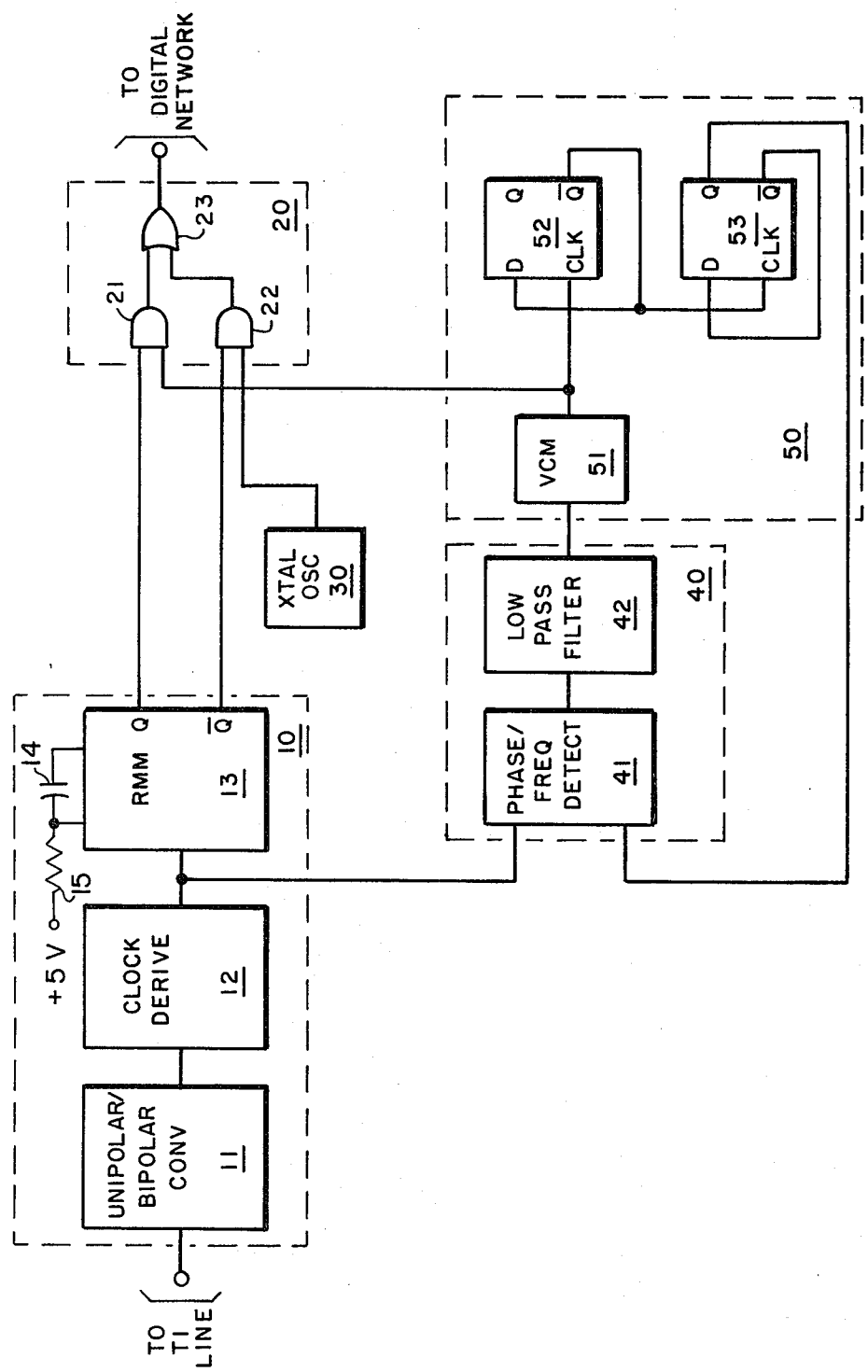

CLOCK SYNCHRONIZATION CIRCUIT

BACKGROUND OF THE INVENTION (1) Field of the Invention

The present invention relates to digital telephone switching systems and more particularly to a clock synchronization circuit for synchronization of internal clock signals to those received externally.

(2) Description of the Prior Art

Communication systems have long been connected to distant switching systems by means of a digital communication link. Some of these communication systems operate under control of an asynchronous clock circuit and employ complex circuitry for monitoring and deciphering the digital information received over the communication link.

More modern communication systems use a clock circuit which operates in synchronism with the digital data received over the communication link. These newer systems typically employ tank circuits for monitoring the presence of the incoming digital signal, and use counter circuits for monitoring the frequency of these signals.

However these arrangements are unnecessarily complex, bulky and expensive. These arrangements are also insufficiently responsive for detection of failure of the incoming digital signal and they operate only to provide frequency synchronization rather than phase synchronization between the incoming digital signal and the internally generated clock signals.

Accordingly, it is the object of the present invention to provide a small, low cost and highly responsive clock synchronization circuit which provides not only frequency synchronization but also phase synchronization between the incoming digital signal and the internally generated clock signals.

SUMMARY OF THE INVENTION

The present invention is a circuit which synchronizes internally generated clock signals to digital data received via a T1 PCM facility. This circuit includes a clock monitor circuit, a crystal oscillator, and a clock generator circuit all connected to a gating circuit. This circuit also includes a phase lock loop which consists of a detector circuit connected between the clock monitor circuit and the clock generator circuit.

The clock monitor circuit operates to convert the bipolar digital input signal to a unipolar clock signal. The T1 input signal has a frequency of 1.544 MHz with a period of 648 nanoseconds. As long as this input signal is present within predetermined tolerances the clock generator circuit is enabled through the gating circuit to the digital network. If the clock monitor circuit detects an input signal that is out of tolerance, it enables the crystal oscillator through the gating circuit.

The clock generator operates to provide clock pulses within a range from 5.776 to 6.576 MHz with a nominal value of 6.176 MHz. This 6.176 MHz signal is provided to the gating circuit for use by the digital network when the incoming bipolar signal is within 15 nano-seconds of its nominal value of 648 nano-seconds. The clock generator also provides a 1.544 MHz signal by dividing the 6.176 MHz signal by 4. The phase and frequency of the clock generator signal is compared with the signal received from the clock monitor circuit by the detector circuit. The detector circuit generates an error signal representative of the difference in frequency and/or phase between these two signals.

The clock generator responds to this error signal by adjusting its output frequency and/or phase to correspond to that of the signal received from the clock monitor circuit. When the two signals are identical in frequency and phase the error signal is inhibited and the clock generator becomes locked in frequency and phase to the signal received from the clock monitor circuit.

DESCRIPTION OF THE DRAWING

The single FIGURE of the accompanying drawing is a logic diagram of a clock synchronization circuit in accordance with the present invention.

DESCRIPTION OF THE PREFERRED EMBODIMENT

Referring now to the accompanying drawing the clock synchronization circuit of the present invention is shown. Clock monitor circuit 10 is shown connected between a T1 line and gating circuit 20. It is also connected to detector 40 which is connected to clock generator circuit 50. Clock generator circuit 50 and crystal oscillator 30 are shown connected to gating circuit 20.

Clock monitor circuit 10 includes clock derive circuit 12 connected between bipolar/unipolar converter 11 and retriggerable monostable multivibrator 13. Gating circuit 20 includes OR gate 23 connected to AND gates 21 and 22 both of which are connected to retriggerable monostable multivibrator 13. Detector 40 includes phase/frequency detector 41 connected to low pass filter 42. Clock generator circuit 50 includes voltage controlled multivibrator 51 connected to low pass filter 42. Clock generator 50 also includes series connected, edge triggered, D-type flip-flops 52 and 53 connected between voltage controlled multivibrator 51 and phase/frequency detector 41.

When digital data is transmitted over the T1 line bipolar/unipolar converter 11 converts this information to a unipolar format, and clock derive circuit 12 generates a pulse for each bit position in the T1 data format. Unipolar/bipolar converter 11 and clock derive circuit 12 are well known circuits used to receive pulse code modulation data over a T1 line. Data is transmitted over a T1 line at a 1.544 MHz rate resulting in a 1 bit position for every 648 nano-seconds.

Capacitor 14 and resistor 15 control the timing of retriggerable monostable multivibrator 13. The resistor and capacitor sizes were choosen so as to cause retriggerable monostable multivibrator 13 to generate a 663 nano-second timing pulse. A retriggerable monostable multivibrator operates to generate its characteristic timing pulse upon each receipt of an incoming clock pulse. Therefore, as along as clock pulses continue arriving at the 648 nano-second rate, retriggerable monostable multivibrator 13 will generate a continuous logic level 1 signal, since a new clock pulse arrives 15 nano-seconds before the termination of the previous characteristic timing pulse. As long as this level 1 signal appears on the Q lead of retriggerable monostable multivibrator 13, AND gate 21 is enabled to gate clock pulses generated by voltage controlled multivibrator 51 to OR gate 23, which gates these clock pulses to the digital network.

If the incoming signal falls or its pulses have a period more than 15 nano-seconds longer than the 648 nano-second period of a T1 pulse train, retriggerable monostable multivibrator 13 times out and generates a logic 0 signal on its Q lead and a logic 1 signal on its $\overline{Q}$ lead. These signals disable AND gate 21 and enable AND gate 22, thereby gating clock pulses from crystal oscillator 30 to the digital network via OR gate 23.

Thus, a fail safe mechanism is provided by this circuit, such that clock pulses synchronized with the incoming pulse train are gated to the digital network as long as the incoming pulse train is within 15 nanoseconds of the nominal T1 period of 648 nano-seconds. Upon detection of failure of the incoming pulse stream, or out of tolerance pulses, retriggerable monostable multivibrator 13 enables crystal oscillator 30 to insure that a constant 6.176 MHz signal is provided to the digital network.

When valid pulses are present in the T1 signal the clock derive circuit provides a 1.544 MHz signal to phase/frequency detector 41. Voltage controlled multivibrator 51 operates to generate a nominal 6.176 MHz signal but is capable of operating within the range of from 5.776 to 6.576 MHz. Thus, gating circuit 20 provides a 6.176 MHz signal to the digital network via voltage controlled multivibrator 51 when the incoming pulse stream is within tolerance and it provides a 6.176 MHz signal to the digital network via crystal oscillator 30 when the incoming pulse stream has failed or is out of tolerance.

Edge triggered D type flip-flops 52 and 53 each operate to divide their clock signal by 2. Thus, in the arrangement shown, the combination of these 2 flip-flops cause the signal generated by voltage controlled multivibrator 51 to be divided by 4 which results in a 1.544 MHz signal being applied to phase/frequency detector 41. This division process is inherent in a D type flip-flop. For instance, if flip-flop 52 is initially reset a logic 1 signal will appear at its $\overline{Q}$ lead and consequently at its D lead. When a clock pulse from voltage controlled multivibrator 51 appears at this flip-flop's clock lead, it causes the logic 1 signal on its D lead to be transferred to its Q lead and correspondingly, a logic 0 signal appears at its $\overline{Q}$ lead. When the next clock pulse appears at the clock lead, a logic 0 signal is on the D lead, which is transferred to the Q lead and consequently a logic 1 signal appears at the $\overline{Q}$ lead. Therefore it takes two clock pulses to generate one pulse on the $\overline{Q}$ lead of flip-flop 52. Flip-flop 53 operates in a similar manner but since its clock lead is connected to the $\overline{Q}$ lead of flip-flop 52, the clock frequency for flip-flop 53 is only half as fast as that for flip-flop 52. Since two pulses must appear on the clock lead of flip-flop 53 to cause one pulse to appear at its Q lead the pulse train generated by flip-flop 52 is divided by 2 which is equivalent to the pulse train generated by voltage controlled multivibrator 51 being divided by 4.

Phase/frequency detector 41 compares the phase and frequency of the pulse train received from clock derive circuit 12 with that received from flip-flop 53. Any difference in phase or frequency causes phase/frequency detector 41 to generate an error signal representative of the difference. This pulsing error signal is filtered by low pass filter 42 to provide a stable error signal to voltage controlled multivibrator 51.

Multivibrator 51 responds to this error signal by adjusting its output frequency and phase in the direction required to minimize the error signal. This process will continue until the error signal is eliminated, at which point, the pulse train generated by voltage controlled multivibrator 51 becomes locked in phase and frequency to the signal generated by clock drive circuit 12.

Retriggerable monostable multivibrator 13, phase/frequency detector 41 and voltage controlled multivibrator 51 are commercially available circuits. Examples of such circuits are Motorola's 74123 retriggerable monostable multivibrator, MC4044 phase/frequency detector and MC4024 voltage controlled multivibrator. Bipolar/unipolar converter 11 and clock drive circuit 12 are also well known circuits used to interface with T1 PCM facilities. An example of such circuits is GTE Automatic Electric's FB-15277 span interface circuit.

The present invention provides a circuit for generating a 6.176 MHz clock signal locked in phase and frequency to an incoming T1 pulse train. It also provides a fail safe means of providing a 6.176 MHz clock signal to a digital network by timing the incoming T1 pulse train and enabling an auxillary 6.176 MHz clock signal upon detection of failure of the T1 pulse train.

It will be obvious to those skilled in the art that numerous modifications of the present invention can be made without departing from the spirit of the invention which shall be limited only by the scope of the claims appended hereto.

What is claimed is:

1. A clock synchronization circuit for use in a telephone switching system including a digital line operated to provide bi-polar digital data of a variable frequency, conversion means connected to said digital line, operated to convert said bi-polar digital data to uni-polar digital data, clock derivation means connected to said conversion means operated to derive clock signals from said uni-polar digital data, and a digital network, said synchronization circuit comprising:
   a retriggerable monostable multi-vibrator connected to said clock derivation means operated in response to said derived clock signals having a frequency above a first predetermined value to generate a first enable signal, and further operated in response to said derived clock signals having a frequency below a predetermined value to generate a second enable signal;
   first clock signal generating means connected to said retriggerable monostable multi-vibrator, operated in response to said derived clock signals to generate a first clock signal having a frequency related to the frequency of said derived clock signals;
   second clock signal generating means operated to generate a second clock signal of a predetermined frequency; and
   gating means connected to said retriggerable monostable multi-vibrator, said first clock signal generating means and said second clock signal generating means, operated in response to said first enable signal to gate said first clock signal to said digital network, and further operated in response to said second enable signal to gate said second clock signal to said digital network.

2. A clock synchronization circuit as claimed in claim 1, wherein said first clock signal generating means is further operated to generate a clock compare signal, said clock synchronization circuit further comprising: detection means connected to said retriggerable monostable multi-vibrator, and said first clock signal generating means, operated in response to a difference in frequency between said derived clock signal and said clock compare signal to generate an error signal; said first clock signal generating means further operated in response to said error signal to adjust the frequency of said clock compare signal to equal the frequency of said derived clock signal; said first clock signal generating means further operated in response to said error signal to proportionately adjust the frequency of said first clock signal.

3. A clock synchronization circuit as claimed in claim 1, wherein said first clock signal generating means is further operated to generate a clock compare signal, said clock synchronization circuit further comprising: detection means connected to said retriggerable monostable multi-vibrator, and said first clock signal generating means, operated in response to a difference in phase between said derived clock signal and said clock compare signal to generate an error signal; said first clock signal generating means further operated in response to said error signal to adjust the phase of said clock compare signal to equal the phase of said derived clock signal; said first clock signal generating means further operated in response to said error signal to adjust the phase of said first clock signal to equal the phase of said derived clock signal.

4. A clock synchronization circuit as claimed in claims 2 or 3, wherein said detection means comprise: a phase/frequency detector, operated in response to said difference in phase or frequency between said derived clock signal and said clock compare signal to generate a signal representative of said difference; and filter means connected to said phase/frequency detector, operated to shape said difference signal, into said error signal.

5. A clock synchronization circuit as claimed in claim 1, wherein said second clock signal generating means comprise a crystal oscillator.

6. A clock synchronization circuit as claimed in claims 2 or 3, wherein said first clock signal generating means comprise: a voltage controlled multivibrator operated to generate said first clock signals within a predetermined range of frequencies.

7. A clock synchronization circuit as claimed in claim 6, wherein said first clock signal generating means further comprise: division means connected to said voltage controlled multivibrator, operated to divide the frequency of said first clock signal by a binary integer, thereby generating said clock compare signal.

8. A clock synchronization circuit as claimed in claim 7, wherein said division means operate to divide the frequency of said first clock signal by 4.

9. A clock synchronization circuit as claimed in claim 6, wherein said gating means comprise a first gate circuit connected to said retriggerable monostable multivibrator and said voltage controlled multivibrator, a second gate circuit connected to said retriggerable monostable multivibrator and said crystal oscillator, and a third gate circuit connected to said first and said second gate circuits, said first gate circuit operated in response to said first enable signal to gate said clock signal generated by said voltage controlled multivibrator to said network via said third gate circuit, and said second gate circuit operated in response to said second enable signal to gate said clock signal generated by said crystal oscillator to said digital network via said third gate circuit.

* * * * *